United States Patent
Byers

(10) Patent No.: US 11,341,629 B2
(45) Date of Patent: May 24, 2022

(54) SYSTEMS AND METHODS FOR GENERATING AN INSPECTION IMAGE OF AN OBJECT FROM RADIOGRAPHIC IMAGING

(71) Applicant: PRATT & WHITNEY CANADA CORP., Longueuil (CA)

(72) Inventor: Justin Byers, Pembroke (CA)

(73) Assignee: PRATT & WHITNEY CANADA CORP.

(*) Notice: Subject to any disclaimer, the term of this patent is extended or adjusted under 35 U.S.C. 154(b) by 132 days.

(21) Appl. No.: 16/919,773

(22) Filed: Jul. 2, 2020

(65) Prior Publication Data
US 2022/0005181 A1    Jan. 6, 2022

(51) Int. Cl.
*G06T 7/00*     (2017.01)
*G06T 3/20*     (2006.01)
*G06T 7/30*     (2017.01)
*B64F 5/60*     (2017.01)

(52) U.S. Cl.
CPC ............ *G06T 7/0004* (2013.01); *B64F 5/60* (2017.01); *G06T 3/20* (2013.01); *G06T 7/30* (2017.01); *G06T 2207/10116* (2013.01); *G06T 2207/30116* (2013.01); *G06T 2207/30136* (2013.01)

(58) Field of Classification Search
CPC .......... G06T 7/0004; G06T 7/30; G06T 3/20; G06T 2207/10116; G06T 2207/30116; G06T 2207/30136; B64F 5/60
See application file for complete search history.

(56) References Cited

U.S. PATENT DOCUMENTS

| | | | |
|---|---|---|---|
| 4,696,024 A * | 9/1987 | Pesch | G01N 23/207 378/147 |
| 4,803,639 A | 2/1989 | Steele et al. | |
| 5,351,307 A | 9/1994 | Prejean-Lefevre | |
| 6,249,568 B1 | 6/2001 | Rizo et al. | |
| 6,630,996 B2 * | 10/2003 | Rao | G01N 21/9501 356/237.1 |
| 6,652,738 B2 * | 11/2003 | Eijsbouts | B01J 23/85 208/111.3 |
| 6,809,809 B2 * | 10/2004 | Kinney | G01N 21/9501 356/237.1 |
| 6,839,470 B2 * | 1/2005 | Ikeda | G06T 7/0004 356/16 |
| 6,907,107 B1 * | 6/2005 | Wallis | G01N 23/207 378/83 |

(Continued)

OTHER PUBLICATIONS

Holler et al., "High-resolution non-destructive three-dimensional imaging of integrated circuits" (Year: 2017).*

*Primary Examiner* — Manav Seth
(74) *Attorney, Agent, or Firm* — Norton Rose Fulbright Canada LLP

(57) ABSTRACT

There are described herein methods and system for generating an inspection image of an object from radiographic imaging. The method comprises obtaining a plurality of digital images of the object positioned between a radiation source and a photon beam detector, the digital images taken at different object-detector distances or source-detector distances to create unique grain diffraction patterns in each one of the digital images, and forming the inspection image from image features common to the digital images at a common scale and removing the unique grain diffraction patterns.

20 Claims, 11 Drawing Sheets

(56) References Cited

U.S. PATENT DOCUMENTS

| | | | |
|---|---|---|---|
| 7,065,258 B2* | 6/2006 | Nahum | G01B 11/002 |
| | | | 250/208.1 |
| 7,158,609 B2* | 1/2007 | Kikuchi | G01N 23/205 |
| | | | 378/70 |
| 7,168,255 B2* | 1/2007 | Saito | H01F 1/012 |
| | | | 62/3.1 |
| 7,590,220 B1 | 9/2009 | Lee et al. | |
| 7,791,810 B2* | 9/2010 | Powell | G02B 27/0101 |
| | | | 359/632 |
| 7,883,669 B2* | 2/2011 | Sun | C12Q 1/686 |
| | | | 422/504 |
| 7,885,467 B2* | 2/2011 | Larsen | G06T 7/12 |
| | | | 382/225 |
| 8,238,611 B2* | 8/2012 | St. Hilaire | G06T 7/521 |
| | | | 382/106 |
| 8,339,568 B2* | 12/2012 | Maeda | G03F 1/84 |
| | | | 355/30 |
| 8,536,548 B2* | 9/2013 | Otani | A61N 5/1048 |
| | | | 250/492.3 |
| 8,605,858 B2 | 12/2013 | Singh et al. | |
| 10,539,515 B2 | 1/2020 | Fischer et al. | |
| 11,071,513 B2* | 7/2021 | Ferng | H01L 23/544 |
| 2004/0105100 A1* | 6/2004 | Shirley | G01B 11/2527 |
| | | | 356/603 |
| 2006/0012802 A1* | 1/2006 | Shirley | G01B 11/2527 |
| | | | 356/603 |
| 2007/0071328 A1* | 3/2007 | Larsen | G06T 7/0004 |
| | | | 382/225 |
| 2007/0263903 A1* | 11/2007 | St. Hilaire | G01B 11/2545 |
| | | | 382/106 |
| 2009/0114860 A1 | 5/2009 | Feke et al. | |
| 2010/0027746 A1* | 2/2010 | Park | G01N 23/207 |
| | | | 378/73 |
| 2011/0038457 A1* | 2/2011 | Huang | G01N 23/207 |
| | | | 378/73 |
| 2012/0162631 A1* | 6/2012 | Hutchin | G01S 7/4815 |
| | | | 356/4.07 |
| 2015/0009321 A1* | 1/2015 | Goldstein | B23Q 17/2457 |
| | | | 348/135 |
| 2017/0004954 A1* | 1/2017 | Akutsu | H01J 37/28 |
| 2020/0209131 A1* | 7/2020 | Hwu | G06T 7/0012 |

* cited by examiner

SYSTEMS AND METHODS FOR GENERATING AN INSPECTION IMAGE OF AN OBJECT FROM RADIOGRAPHIC IMAGING

TECHNICAL FIELD

The present disclosure relates generally to radiographic imaging, and more particularly to imaging of objects under inspection using industrial radiography to perform non-destructive testing.

BACKGROUND OF THE ART

Non-destructive testing (NDT) refers to various techniques used to evaluate the properties of a material, component, or system without causing damage. Such techniques may also be referred to as non-destructive examination (NDE), non-destructive inspection (NDI), and non-destructive evaluation (NDE). Industrial radiography is a modality of NDE that uses ionizing radiation to inspect objects in order to locate and quantify defects and degradation in material properties that would lead to the failure of engineering structures.

While existing systems for industrial radiography are suitable for their purposes, improvements remain desirable.

SUMMARY

In accordance with a broad aspect, there is provided a method for generating an inspection image of an object from radiographic imaging. The method comprises obtaining a plurality of digital images of the object positioned between a radiation source and a photon beam detector, the digital images taken at different object-detector distances or source-detector distances to create unique grain diffraction patterns in each one of the digital images, and forming the inspection image from image features common to the digital images at a common scale and removing the unique grain diffraction patterns.

In accordance with another broad aspect, there is provided a system for generating an inspection image of an object from radiographic imaging. The system comprises a processing unit and a non-transitory computer-readable medium having stored thereon program instructions. The program instructions are executable by the processing unit for obtaining a plurality of digital images of the object positioned between a radiation source and a photon beam detector, the digital images taken at different object-detector distances or source-detector distances to create unique grain diffraction patterns in each one of the digital images, and forming the inspection image from image features common to the digital images at a common scale and removing the unique grain diffraction patterns.

In accordance with yet another broad aspect, there is provided a method for inspecting an aircraft component. The method comprises obtaining a plurality of digital images of the aircraft component positioned between a radiation source and a photon beam detector, the digital images taken at different object-detector distances or source-detector distances to create unique grain diffraction patterns in each one of the digital images; registering the plurality of digital images to a common scale; removing differences between the plurality of digital images at the common scale to generate an inspection image; and inspecting the aircraft component using the inspection image.

Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

It will be noted that throughout the appended drawings, like features are identified by like reference numerals.

DETAILED DESCRIPTION

An industrial radiography system can be used for performing non-destructive testing (NDT) on metal-based objects for evaluation of discontinuities and/or defects/flaws within material volume. Objects for testing are generally produced through common manufacturing processes such as welding, casting, additive or composite aero-structures. For example, the object can be an aircraft component, such as a heavy alloy cast airfoil or a light alloy cast accessory gearbox. Radiographic inspection, when applied to objects produced with these processes, may inherently produce patterns on radiographs due to a diffraction effect, also known as mottle, caused by the preferential diffraction of photons travelling through the grain structure of the object material. These patterns can obscure relevant indications or defects on the final radiograph of the object for inspection, such as common process-related defects within the object. Grain diffraction can contribute to added inspection times, false positives, or false negatives where defects have potential to be missed.

Figure 1A:
FIG. 1A is an example of a digital image of an object taken at a first object-detector and object-source position.

There is described herein systems and methods for generating inspection images of objects through radiographic imaging, where the effect of grain diffraction is reduced and/or eliminated. Referring to FIG. 1A, there is illustrated an example of a first digital image $I_1$ of an object. A defect 100 is obstructed by a first grain diffraction pattern 102. Image $I_1$ was taken with the object positioned between a radiation source and a photon beam detector, at a first object-detector distance $d_{od\_1}$ and a first object-source distance $d_{os\_1}$. The grain diffraction pattern 102 is caused by photon beams emitted by the radiation source impinging on the object at a given incident angle.

Figure 1B:
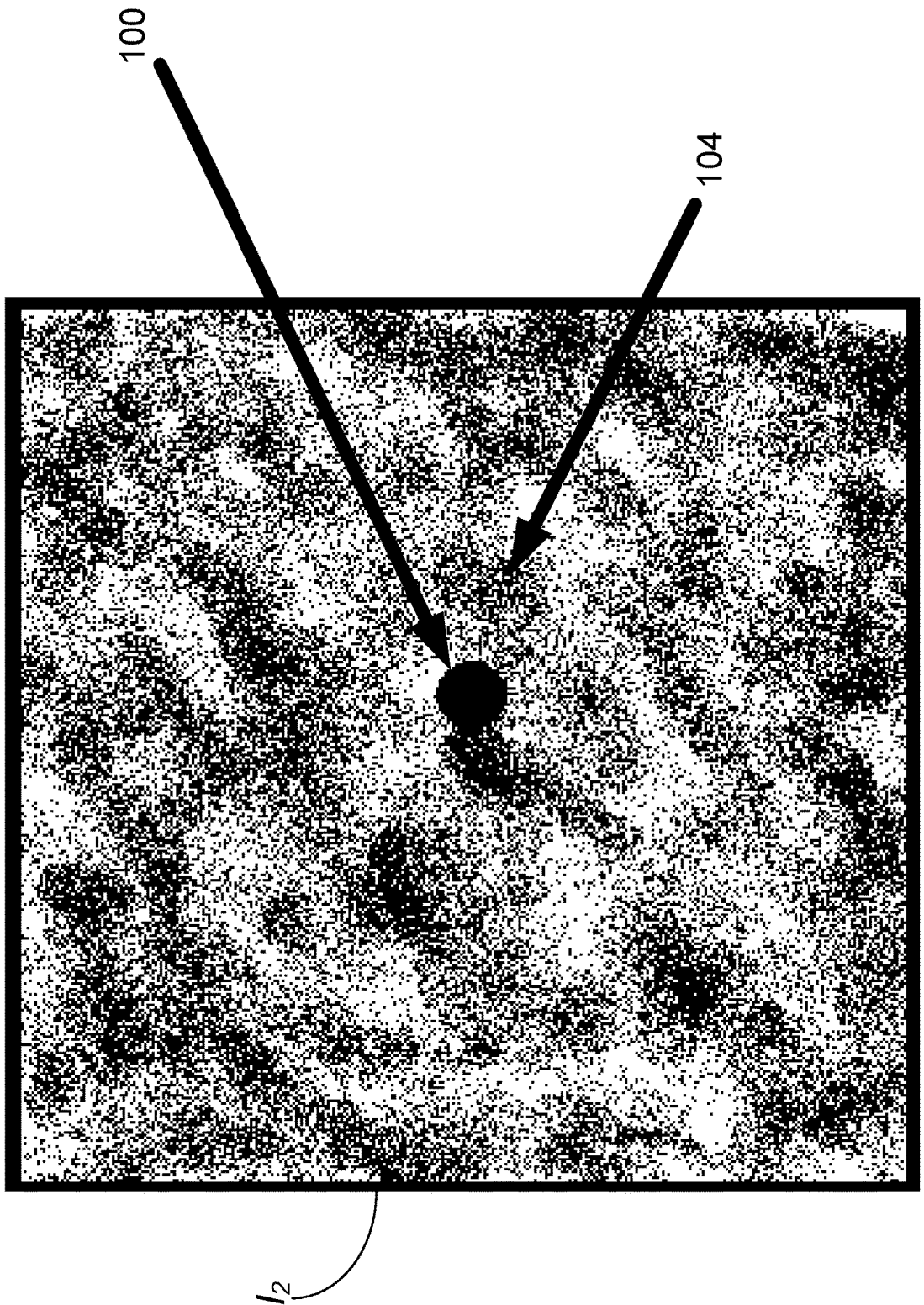
FIG. 1B is an example of a digital image of an object taken at a second object-detector and/or object-source position.
Figure 1C:
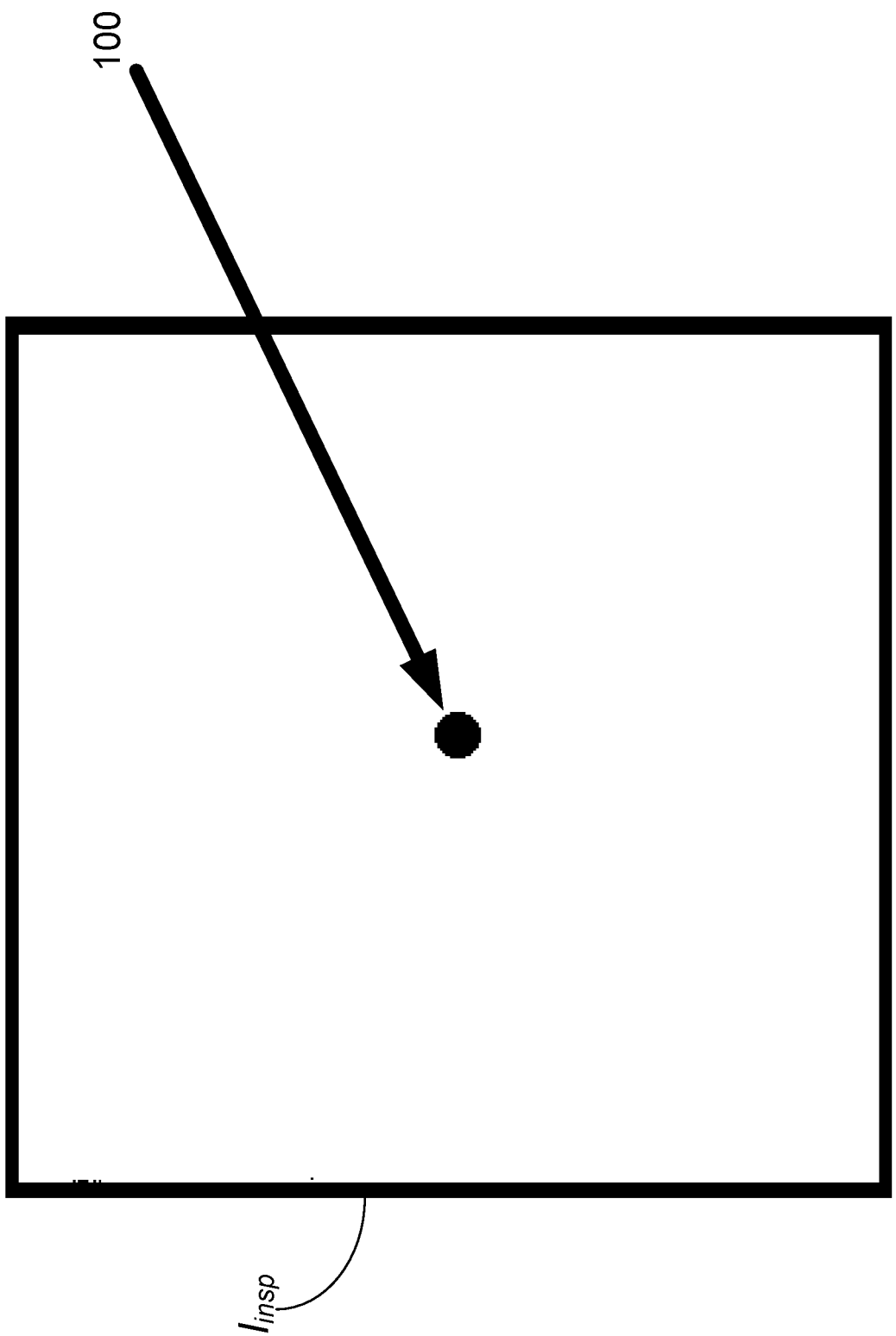
FIG. 1C is an example of an inspection image generated from the digital images of FIGS. 1A and 1B.

Referring to FIG. 1B, there is illustrated an example of a second digital image $I_2$ of the same object, where at least one of the object-detector distance and the object-source distance has changed. The defect 100 is still present and is obstructed by a new grain diffraction pattern 104. Indeed, the change in at least one of the object-detector distance and the object-source distance causes the grain diffraction pattern in the digital image to change due to a change in the incident angle of the photon beams on the object, thus leading to a unique grain diffraction pattern per relative position of the object with respect to the source and the detector.

An inspection image is formed from digital images $I_1$ and $I_2$. More specifically, only the image features found in both digital images $I_1$ and $I_2$, i.e. that are common to both digital images, are retained and the unique diffraction patterns are removed in order to form the inspection image $I_{insp}$, an example of which is illustrated in FIG. 10. It will be understood that in some cases, there may be remnants of the diffraction patterns in the inspection image $I_{insp}$. However, the inspection image will have significantly less noise, thus facilitating inspection. Although the examples herein show the inspection image $I_{insp}$ generated from two images, it will be understood that more than two images may be used. Visual inspection and/or assisted defect recognition systems may be used to inspect the object using the inspection image $I_{insp}$.

Figure 2A:
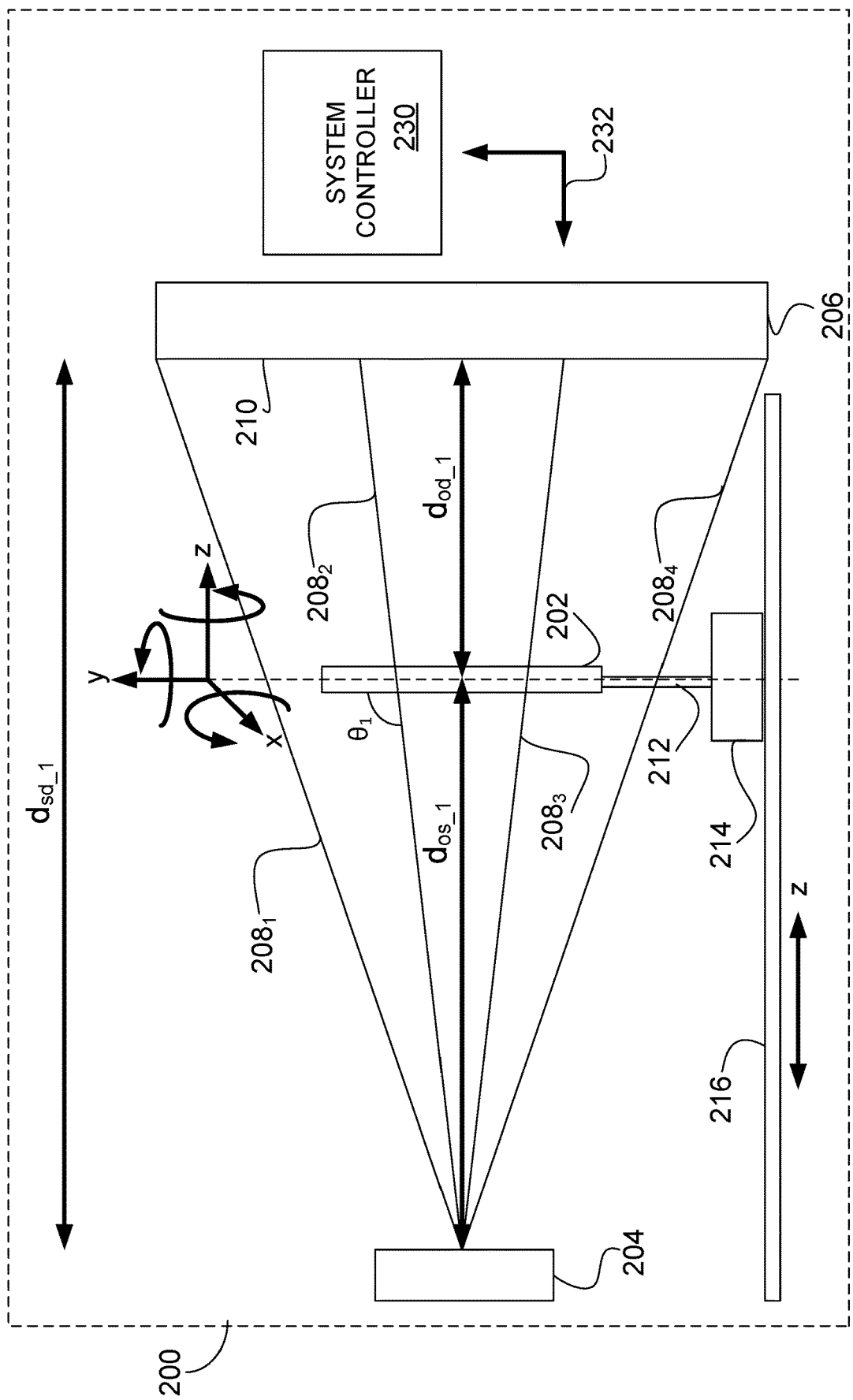
FIG. 2A is a schematic diagram of an example industrial radiography system with a displaceable object located at a first position.

Referring to FIG. 2A, there is illustrated an example industrial radiography system 200 for acquiring digital images of an object 202 that can be used to generate an inspection image. As used herein, the expression "digital image" refers to a digital radiograph obtained through radiographic imaging with the object at a fixed position. A digital image may be obtained from a single radiographic exposure of the object at the fixed position to ionizing or non-ionizing radiation, or from multiple radiographic exposures of the object 202 at the fixed position. Any known techniques for combining multiple radiographic exposures of the object at the fixed position may be used to obtain the digital image. For example, frame averaging may be used to reduce noise patterns created by factors such as scattering. Other image processing techniques may also be used.

In some embodiments, the industrial radiography system 200 is a digital radiography (DR) system. The object 202 is positioned between the source 204 and the detector 206 for imaging thereof. The source 204 is an X-ray generator having components arranged therein to generate high-energy electromagnetic radiation in the form of X-rays. Alternatively, the source 204 is a gamma ray generator that generates gamma rays by the natural radioactivity of sealed radionuclide sources. Other types of radiation may also be used. The source 204 produces photon beams $208_i$ that are projected towards the object and captured by the detector 206. Although only four photon beams $208_i$ are illustrated, more or less beams may be projected onto the object 202. For illustration purposes, beams $208_2$ and $208_3$ are shown intersecting the object 202 and beams $208_1$ and $208_4$ are shown not intersecting the object 202.

The detector 206 is a digital image capture device that captures the beams $208_i$, as they impinge on a surface 210 thereof. In some embodiments, the digital image capture device is an indirect flat panel detector, where the photon beams are converted to light and the light is converted to charge. In some embodiments, the digital image capture device is a charge-coupled device (CCD) detector, where the photon beams are converted to light and the light is converted to charge. In some embodiments, the digital image capture device is a direct flat panel detector, where the photon beams are converted directly into charge. The charge may be read out using a thin film transistor array to form a digital image.

In some embodiments, the industrial radiography system 200 includes a system controller 230 operatively connected to the source 204, the detector 206, or both, through wired and/or wireless connections 232. For example, the connections 232 can include co-axial cable(s), infrared, Zigbee, Bluetooth, optical fibers, and any other communication technology for exchanging data between the system controller 230 and other components of the system 200. The system controller 230 is composed of software and hardware components arranged to control the system 200 by triggering the source 204 and/or operating the detector 206. The captured photon beams $208_i$ may be converted to light by the system controller 230. The captured photon beams $208_i$ may also be converted to charges by the system controller 230. The system controller 230 can read out the charge so as to form an image. In some embodiments, the system controller 230 performs image processing on the acquired images, as will be explained in more detail below.

In some embodiments, the industrial radiography system 200 is a computed radiography (CR) system. In this case, the detector 206 is a cassette-based phosphor storage plate which is then scanned into a digital format to produce the digital image.

In order to obtain the first image $I_1$, the object 202 is positioned at a first location between the source 204 and the detector 206. When the object is at the first location, the object 202 and detector 206 are separated by an object-detector distance of $d_{od\_1}$, and the object 202 and source 204 are separated by an object-source distance of $d_{os\_1}$, where the sum of the object-detector distance and the object-source distance is a source detector distance $d_{sd\_1}$. Photon beams $208_2$, $208_3$ impinge on the object at a given angle of incidence, contributing to the grain diffraction pattern 102 as illustrated in FIG. 1A. For example, photon beam $208_2$ has an incident angle $\theta_1$ on the object 202.

In some embodiments, the object-detector distance and/or object-source distance is changed by displacing the object 202 while the source 204 and the detector 206 remain fixed. For example, the object 202 may be fixedly mounted to a support 212 attached to a base 214. The base 214 translates the object 202 along a Z-axis, for example via a track 216, to position the object 202 at a second location, in order to obtain the second image $I_2$. In some embodiments, translation of the object 202 is effected by the system controller 230, which can be operatively connected to the support 212, base 214, track 216, or any combination thereof.

Figure 2B:
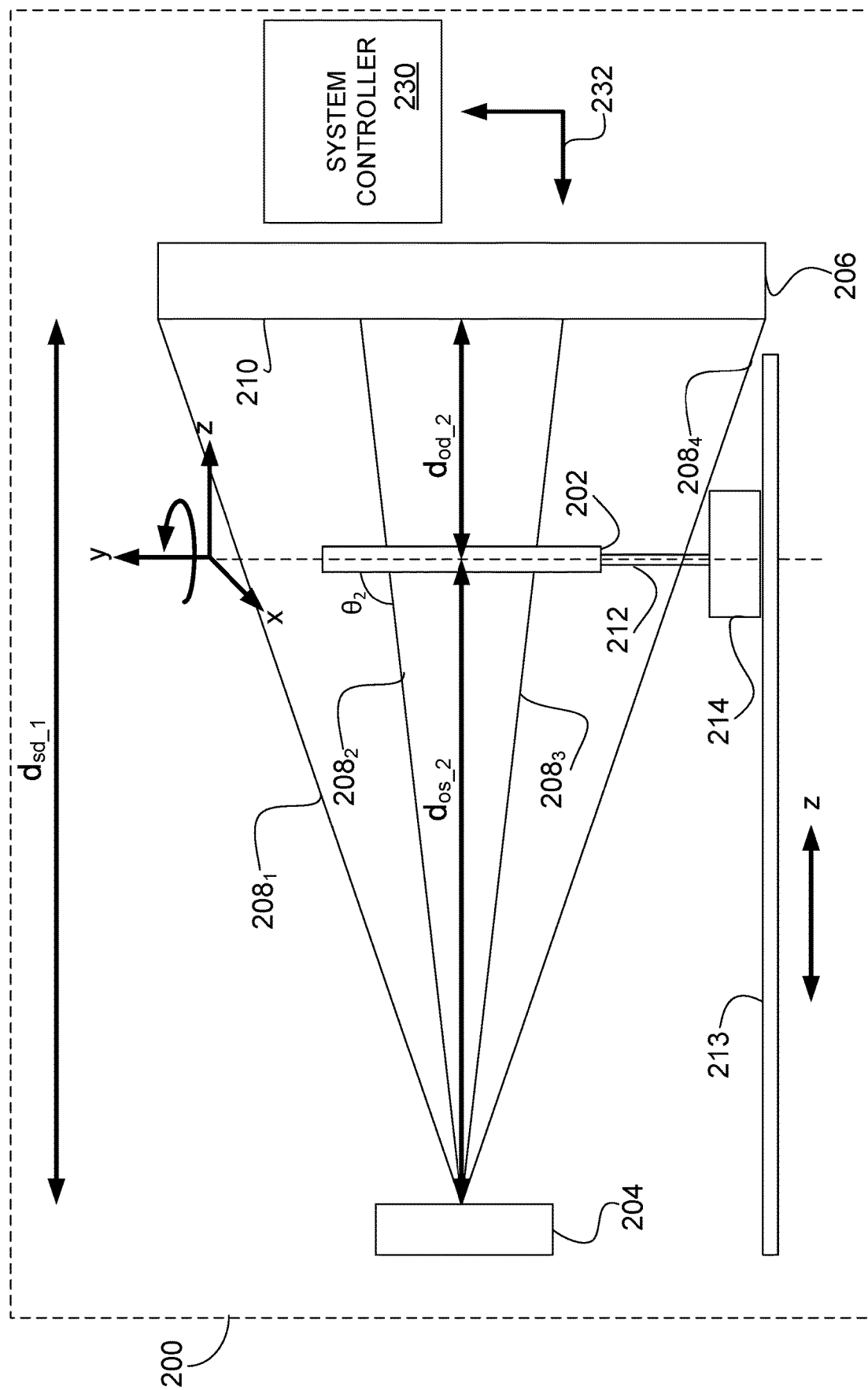
FIG. 2B is a schematic diagram of an example the industrial radiography system of FIG. 2A with the object located at a second position.

FIG. 2B illustrates an example where the object 202 has been translated along the track 216 to the second location. Translation of the object leads to a new object-detector distance $d_{od\_2}$, where $d_{od\_2} < d_{od\_1}$, and a new object-source distance $d_{os\_2}$, where $d_{os\_2} > d_{os\_1}$. Note that the source-detector distance $d_{sd\_1}$ has not changed as the source 204 and detector 206 remain fixed while the object 202 is displaced. In this example, photon beam $208_2$ has an incident angle $\theta_2 \neq \theta_1$ on the object 202, thus causing a different grain diffraction pattern 204 in image $I_2$.

Figure 2C:
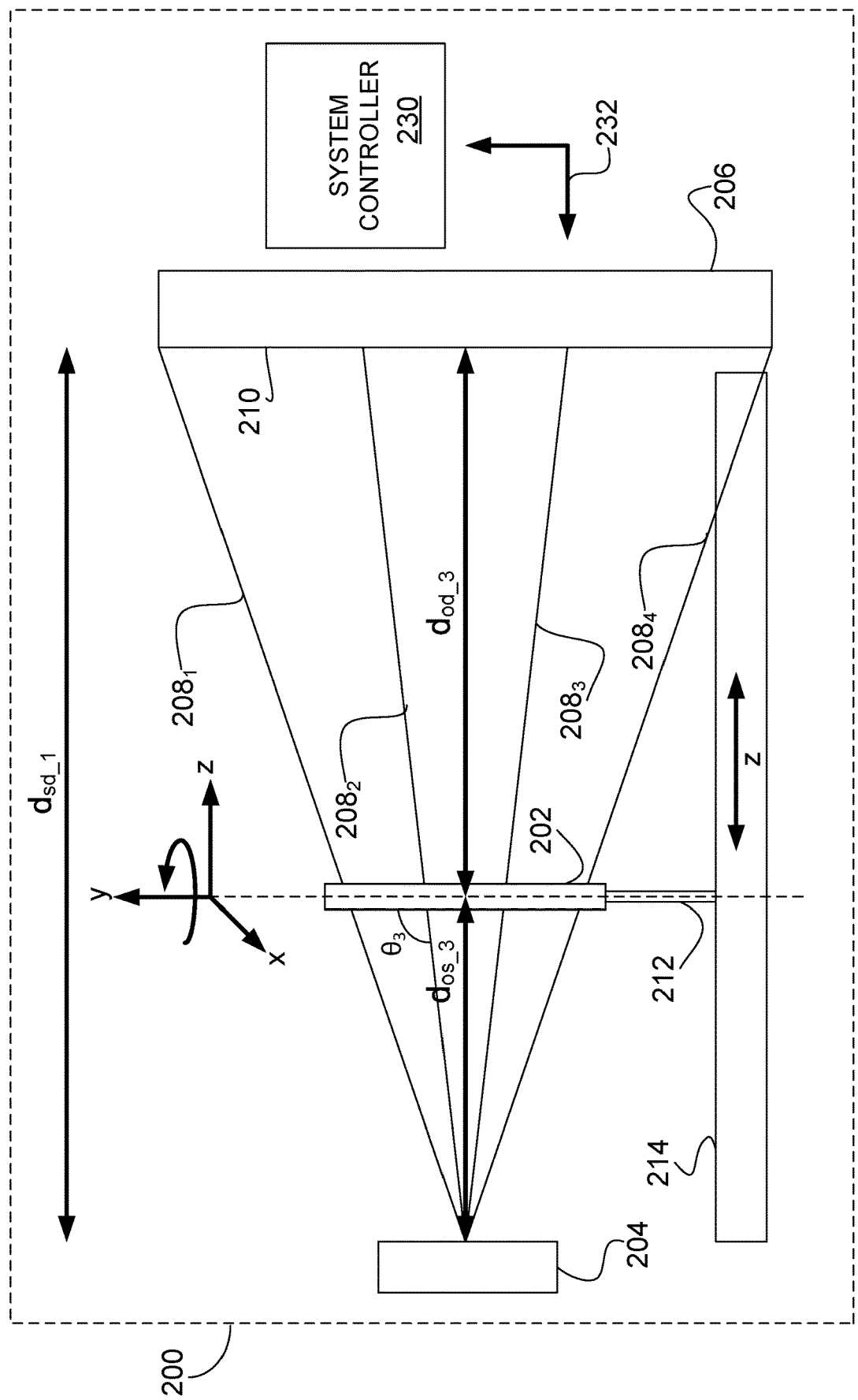
FIG. 2C is a schematic diagram of another example radiography system for with a displaceable object located at a third position.

FIG. 2C illustrates an alternative embodiment for translating the object 202 to a new location along the Z-axis. In this example, the track 216 is omitted, the base 214 extends along the Z-axis, and the support 212 translates along the base 214. The object 202 is thus located at location $Z_3$, which leads to a new object-detector distance $d_{od\_3}$, where $d_{od\_2} < d_{od\_1} < d_{od\_3}$, and a new object-source distance $d_{os\_3}$, where $d_{os\_2} > d_{os\_1} > d_{os\_3}$. Again, the source-detector distance $d_{sd\_1}$ has not changed as the source 204 and detector 206 remain fixed while the object 202 is displaced. A new incident angle $\theta_3$ results from the beam $208_2$ impinging on the object 202, thus again changing the grain diffraction pattern in a digital image acquired with the object at this new location.

Figure 3A:
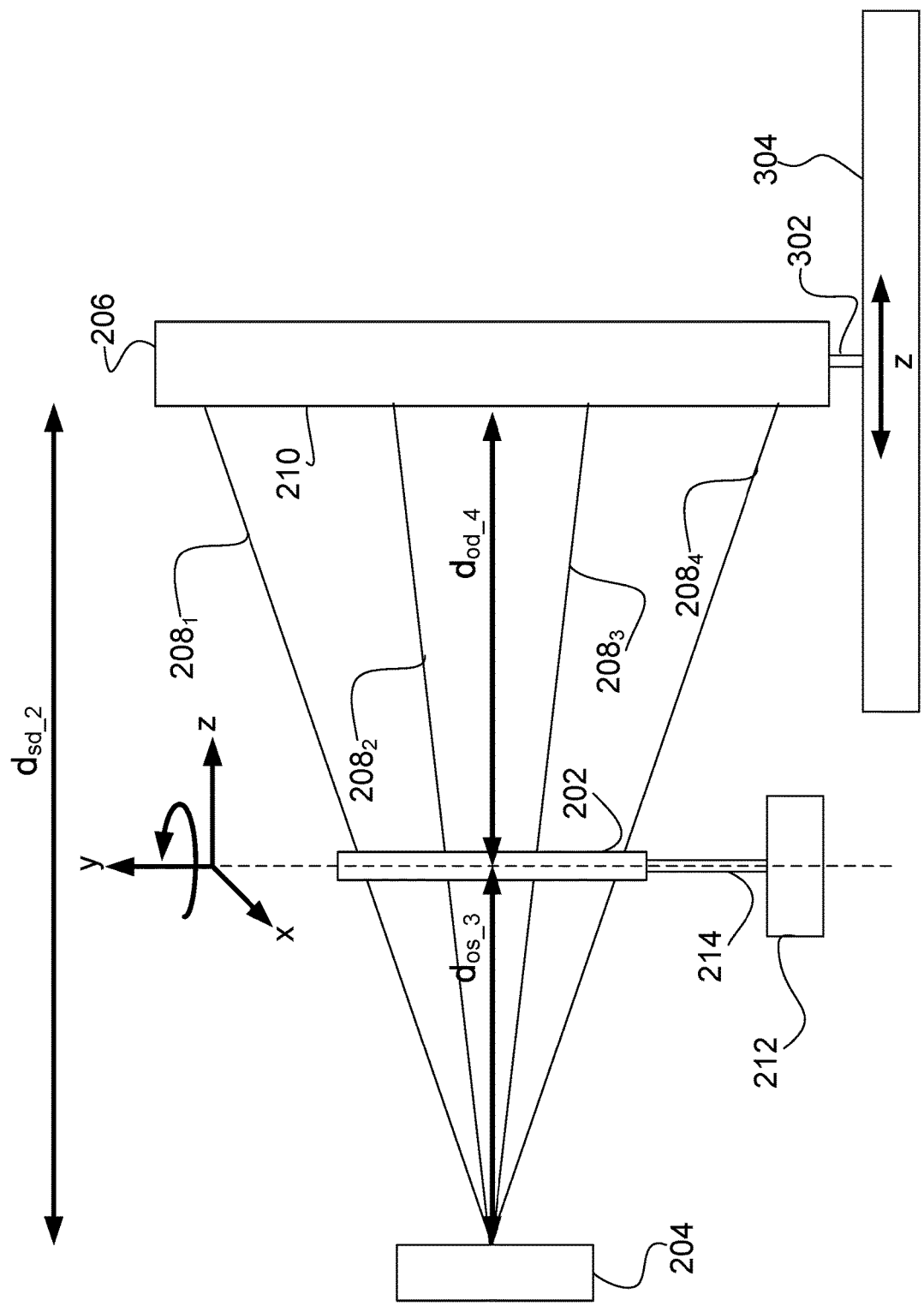
FIG. 3A is a schematic diagram of an example industrial radiography system with a displaceable detector.
Figure 3B:
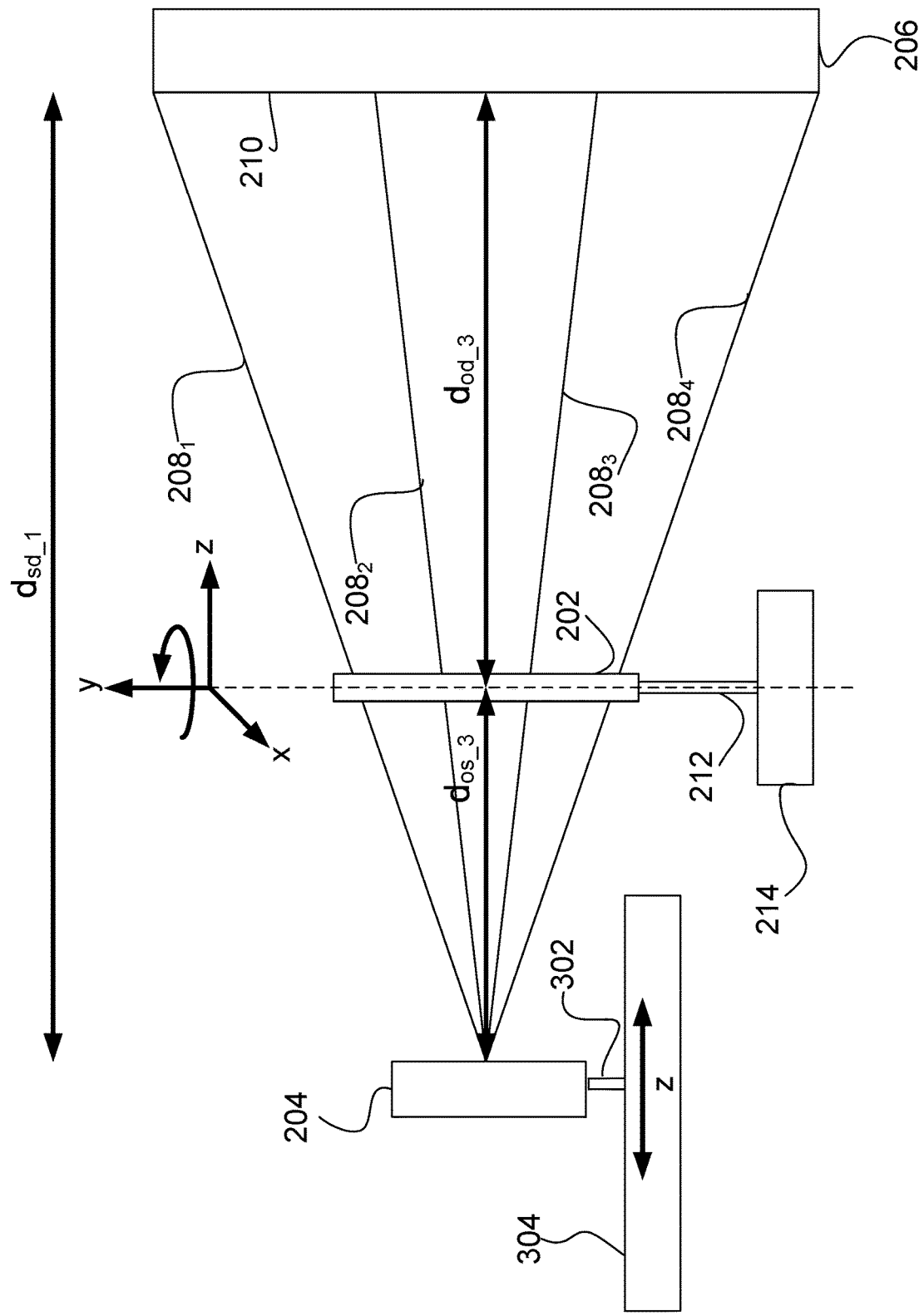
FIG. 3B is a schematic diagram of an example industrial radiography system with a displaceable source.

In some embodiments, the object 202 remains fixed and it is the source 204 or the detector 202 that translates along the Z-axis. Examples are shown in FIGS. 3A and 3B. In FIG. 3A, the detector 206 is mounted to a support 302 that translates along a base 304 along the Z-axis. In this case, the object-detector distance varies ($d_{od\_4}$) while the object-source distance remains fixed ($d_{os\_3}$). The source-detector distance ($d_{sd\_2}$) changes for each image acquisition. In FIG. 3B, the source 204 is mounted to the support 302 that translates along the base 304 along the Z-axis. This configuration allows the object-source distance ($d_{os\_3}$) to be varied between image acquisitions while the object-detector distance ($d_{od\_3}$) remains fixed. The source-detector distance ($d_{sd\_1}$) changes for each image acquisition. It will be understood that when the object-source distance changes, certain requirements may be imposed to ensure a suitable sharpness for the image and a desired resolution, and to avoid an excessive penumbral effect. For example, there may be a minimum value for the object-source distance. Other constraints may also apply.

Figure 4:
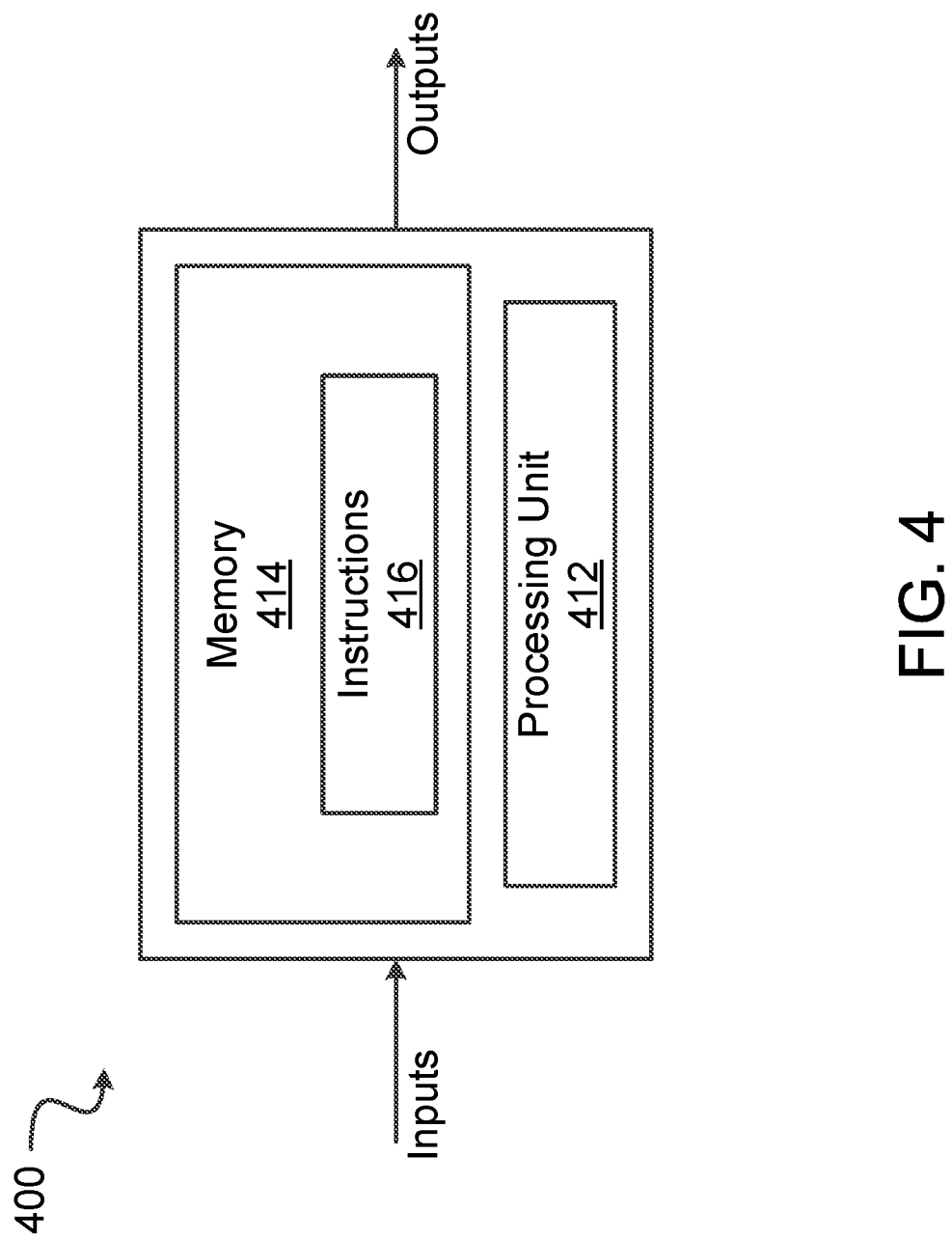
FIG. 4 is a block diagram of an example computing device for generating an inspection image.

In some embodiments, the inspection image can be generated using a computing device 400 as illustrated in FIG. 4. It should be noted that the computing device 400 may be implemented as part of the system controller 230 or separately therefrom. Indeed, the computing device 400 can form part or all of the system controller 230. In some embodiments, the computing device 400 is within the system controller 230 and cooperates with other hardware and/or software components therein. In such cases, the system controller 230 generates the inspection image. In some embodiments, the computing device 400 is external to the system controller 230 and interacts with the system controller 230, for example to obtain the digital images and/or to transmit parameters for acquiring the digital images. In some embodiments, some hardware and/or software components are shared between the system controller 230 and the computing device 400, without the computing device 400 being integral to the system controller 230. In this case, the system controller 230 can perform part of the steps for generating the inspection image.

The computing device 400 comprises a processing unit 402 and a memory 404 which has stored therein computer-executable instructions 406. The processing unit 402 may comprise any suitable devices configured to cause a series of steps to be performed such that instructions 406, when executed by the computing device 400 or other programmable apparatus, may cause functions/acts/steps described herein to be executed. The processing unit 402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

With reference to FIG. 5A, there is illustrated an example method 500 for generating the inspection image, as performed, for example, by the computing device 400. The steps for the method 500 may be embodied as instructions 416 stored in memory 414 of the computing device 400.

At step 502, a plurality of digital images of the object are obtained at different object-detector distances and/or object-source distances. In some embodiments, obtaining the digital images comprises receiving the digital images having been acquired by a separate device, such as the system controller 230. In some embodiments, obtaining the digital images comprises retrieving the digital images, for example from a database, library, or other storage medium that is local or remote to the computing device 400. In some embodiments, obtaining the digital images comprises acquiring the digital images by controlling the components of the industrial radiography system 200. In some embodiments, obtaining the digital images comprises acquiring the digital images by causing the system controller 230 to acquire the digital images.

The different object-detector and/or object-source distances at which the digital images are acquired can be input manually or they can be pre-programmed and stored in the memory 414. Alternatively, the object-detector and/or object-source distances are stored remotely to the computing device 400 and retrieved by the computing device 400. In some embodiments, parameters used to compute the object-detector and/or object-source distances are pre-programmed or retrieved from a remote location. For example, the parameters may indicate that the initial object-detector and/or object-source distance be increased by a fixed value for each digital image acquisition. In another example, the parameters may indicate that the fixed value changes between each digital image acquisition. In either case, the new distance can be computed in real-time by the computing device 400 based on the parameters and on the initial position of the object with respect to the source and the detector. The initial position of the object may be dictated by an operator of the industrial radiography system 200 upon mounting of the object, it may be pre-set, or it may be determined dynamically based on one or more parameter. In the latter two cases, the computing device 400 displaces the object 200 to its initial position. As indicated above, the object-detector and/or object-source distances can be changed by displacing any one of the object, the source, and the detector. Such displacement may, in some embodiments, be effected by the computing device 400 and form part of the method 500, at step 502.

When the digital images are acquired with different object-detector distances, the digital images may need to be registered to a common scale, as per step 503. A common scale is understood to mean that the digital images are based on a same image coordinate system, whereby the pixels are positioned at a same location and orientation from one image to the other. The phenomenon that results from acquiring images at different object-detector distances is illustrated with FIGS. 1A and 1B, where the defect 100 is shown to be smaller in FIG. 1A than it is in FIG. 1B. Image registration refers to selecting one of the digital images as the designated view and registering the other digital images to the designated view through image processing techniques such as feature recognition, absolute pixel binning, or interpolated pixel binning. In some embodiments, image registration comprises scaling one or more of the digital images. Any known techniques may be used to perform image registration. In the example of FIGS. 1A and 1B, image 1B is registered to the view of FIG. 1A, such that the scale of FIG. 1A is maintained for the defect 100 in FIG. 10.

When only the object-source distance changes and the object-detector distance remains fixed, step 503 can be omitted. Step 503 can also be omitted if the digital images are registered to the common scale prior to being obtained at step 502. For example, the digital images may be registered by the system controller 230 and subsequently transmitted to the computing device 400. In another example, registered digital images are stored on a remote storage device and retrieved by the computing device 400 at step 502. Other embodiments are also considered.

At step 504, the inspection image is formed from image features that are common to the digital images acquired with different object-detector and/or object-source distances, and the grain diffraction patterns unique to each digital image are removed.

In some embodiments, step 504 is performed using pixel to pixel comparison between the two or more digital images. A pixel of an output image is set to zero ("0") if the corresponding pixel values of the digital images are different, and is set to one ("1") if the corresponding pixel values of the digital images are the same. The comparison can be initially performed with two digital images as input to obtain an output image. The comparison is then repeated with the output image as one of the input images and another digital image as the other input image. The process may be repeated for as many digital images as needed. Alternatively, the comparison may be performed in a single step, with all of the digital images as input, in order to generate the inspection image as the output image. This process results in an inspection image similar to that illustrated in FIG. 10.

In another embodiment, step 504 can be performed using pixel subtraction followed by image inversion. A pixel of an output image is set as the difference between a pixel value from a first image and a corresponding pixel value from the second image. In this manner, all common image features (i.e. same pixel values) would be set to zero and non-common image features (i.e. different pixel values) would result in a non-zero value. By inversing the zero and non-zero values from the output image, i.e. mapping the non-zero values to zero and the zero values to non-zero, an inspection image similar to that illustrated in FIG. 10 results.

Many different image arithmetic techniques may be used to generate the inspection image, as will be readily understood by those skilled in the art. It will also be understood that the method 500 can be performed by the computing device 400 in substantially real-time.

In some embodiments, the method 500 is performed a plurality of times per object. For example, the object 202 may have up to six degrees of freedom, such that it can be translated up, down, left, and right as well as rotated about each one of its axes. It may be desirable to obtain multiple views of the object 202, in order to increase the coverage obtained. As such, the method 500 may be performed for each view of the object 202. Each iteration of the method 500 results in an inspection image for a given view.

Figure 6:
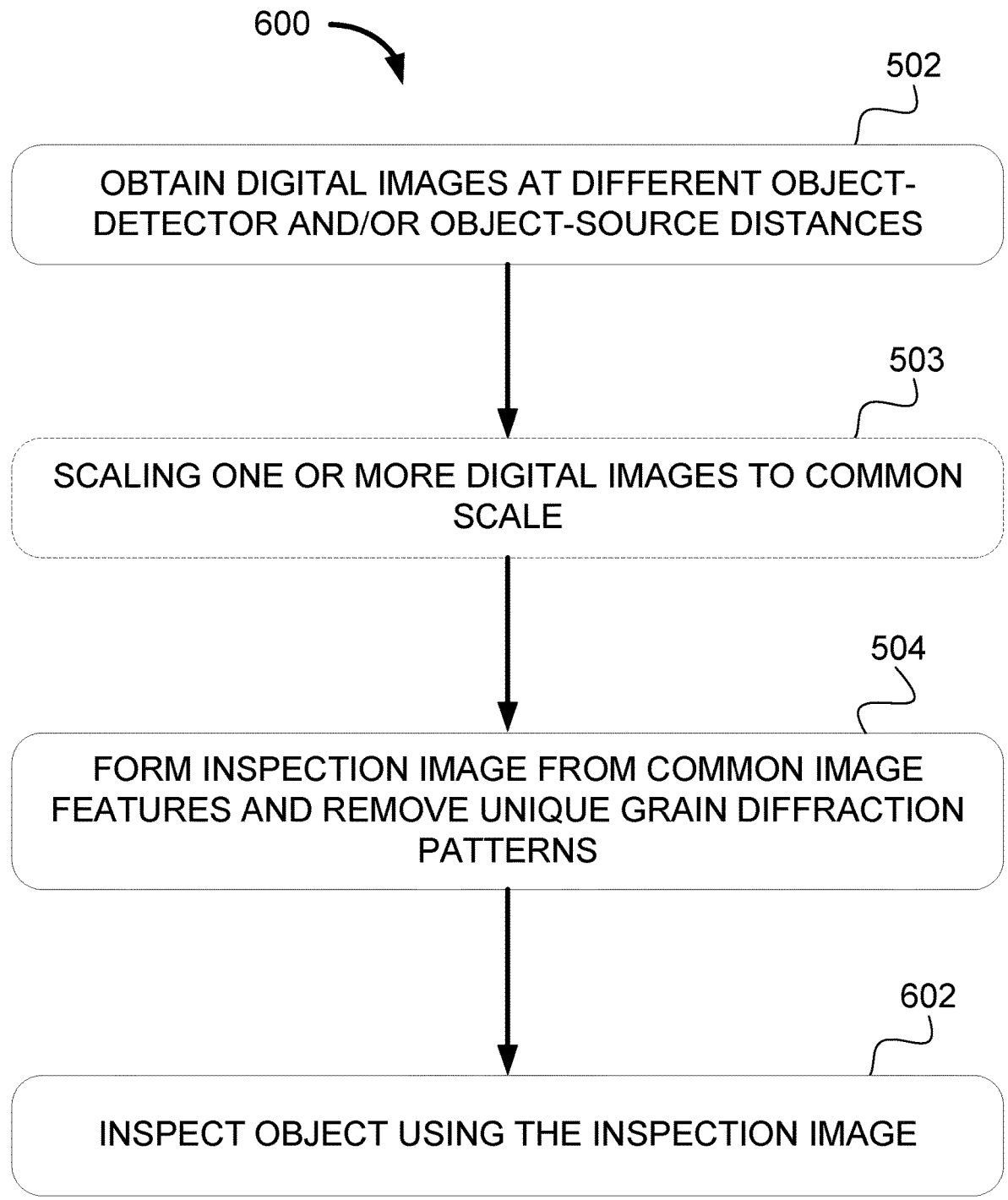
FIG. 6 is a flowchart of a method for inspecting an object.

With reference to FIG. 6, there is illustrated a method 600 for inspecting an object. In some specific and non-limiting examples, the object is an aircraft component, such as an airfoil. In some specific and non-limiting examples, the object is an engine component, such as an accessory gearbox. Other aircraft and/or engine components may also apply.

Figure 5:
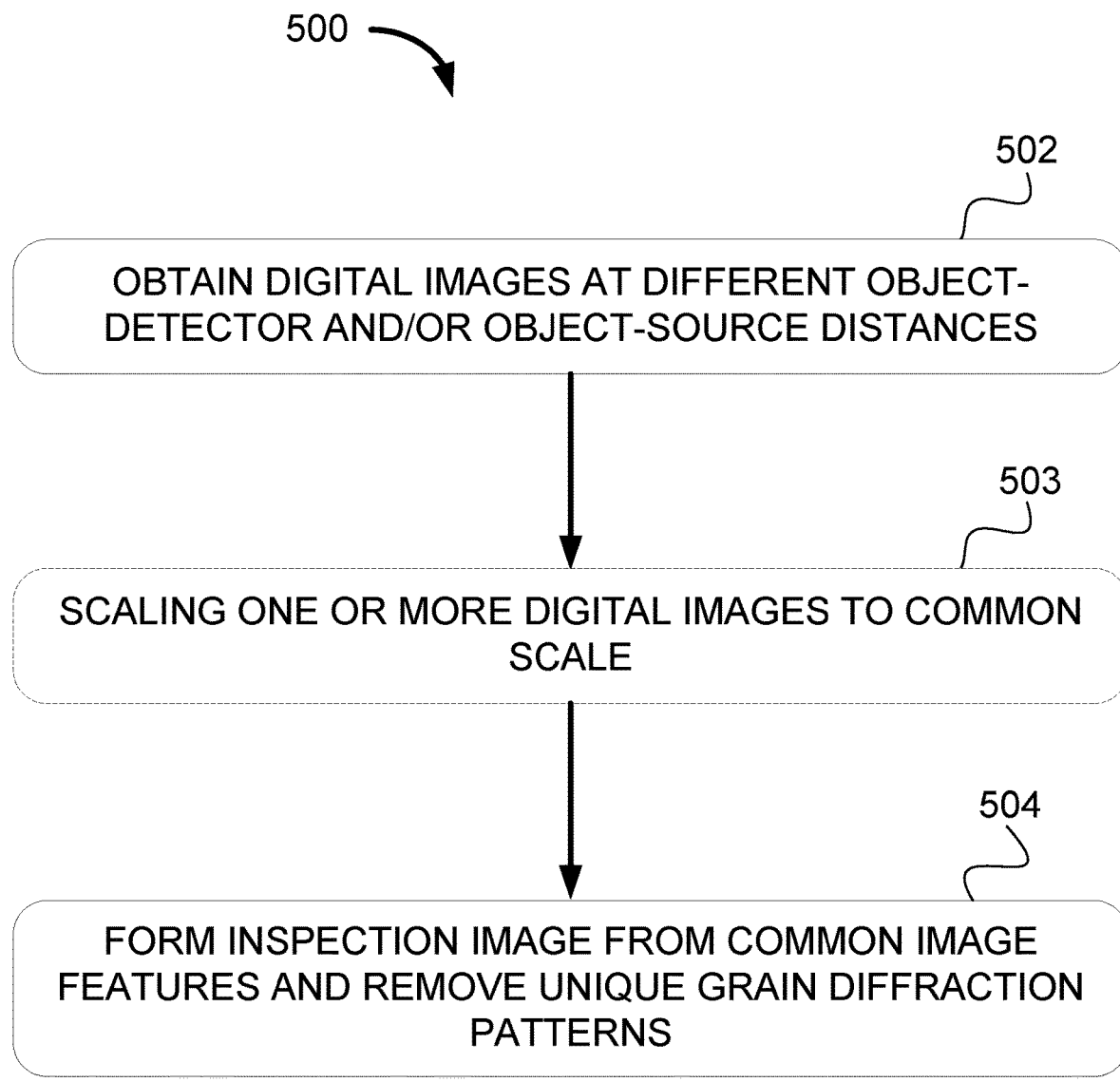
FIG. 5 is a flowchart of a method for generating an inspection image.

All of the embodiments described with respect to the method 500 of FIG. 5 also apply to the method 600 of FIG. 6. At step 602, the inspection image as generated from steps 502-504 is used to inspect the object. The inspection may be visual, automated, or a combination thereof. In some embodiments, step 602 comprises an automated inspection performed by the computing device 400. Any known inspection technique based on digital imaging may be used for step 602.

The methods and systems described herein may be implemented in a high level procedural or object oriented programming or scripting language, or a combination thereof, to communicate with or assist in the operation of a computer system, for example the computing device 400. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the methods 500, 600 may be fully integrated into a digital radiography (DR) or computed radiography (CR) system. The DR or CR system may be encased in a housing that includes the source 204, detector 206, and support 212, with an embedded system controller 230 having all of the functions described herein for changing the object-detector and/or object-source distance between image acquisitions and generating the inspection image from the acquired digital images. Yet further modifications could be implemented by a person of ordinary skill in the art in view of the present disclosure, which modifications would be within the scope of the present technology.

The invention claimed is:

1. A method for generating an inspection image of an object from radiographic imaging, the method comprising:
obtaining a plurality of digital images of the object positioned between a radiation source and a photon beam detector, the digital images taken at different object-detector distances or source-detector distances to create unique grain diffraction patterns in each one of the digital images; and forming the inspection image from image features common to the digital images at a common scale and removing the unique grain diffraction patterns.

2. The method of claim 1, further comprising registering the digital images to the common scale prior to forming the inspection image.

3. The method of claim 1, wherein forming the inspection image comprises performing a pixel to pixel comparison between the digital images, and setting pixels of the inspection image to zero when the pixel values of the digital images differ and non-zero when the pixel values of the digital images match.

4. The method of claim 1, wherein obtaining the plurality of digital images comprises acquiring a first digital image of the object at a first object-detector distance and acquiring a second digital image of the object at a second object-detector distance different from the first object-detector distance.

5. The method of claim 4, wherein acquiring the first digital image and the second digital image comprises translating the object from a first location at the first object-detector distance to a second location at the second object-detector distance.

6. The method of claim 4, wherein acquiring the first digital image and the second digital image comprises translating the photon beam detector from a first location at the first object-detector distance to a second location at the second object-detector distance.

7. The method of claim 1, wherein the radiation source is an x-ray generator.

8. The method of claim 1, wherein the photon beam detector is a digital image capture device, and wherein the radiation source and the photon beam detector form a digital radiography system.

9. The method of claim 1, wherein the photon beam detector is a cassette-based phosphor storage plate, and wherein the radiation source and the photon beam detector form a computed radiography system.

10. The method of claim 1, wherein the object is an aircraft component.

11. A system for generating an inspection image of an object from radiographic imaging, the system comprising:
a processing unit; and
a non-transitory computer-readable medium having stored thereon program instructions executable by the processing unit for:
obtaining a plurality of digital images of the object positioned between a radiation source and a photon beam detector, the digital images taken at different object-detector distances or source-detector distances to create unique grain diffraction patterns in each one of the digital images; and forming the inspection image from image features common to the digital images at a common scale and removing the unique grain diffraction patterns.

12. The system of claim 11, wherein the program instructions are further executable for registering the digital images to the common scale prior to forming the inspection image.

13. The system of claim 11, wherein forming the inspection image comprises performing a pixel to pixel comparison between the digital images, and setting pixels of the inspection image to zero when the pixel values of the digital images differ and non-zero when the pixel values of the digital images match.

14. The system of claim 11, wherein obtaining the plurality of digital images comprises acquiring a first digital image of the object at a first object-detector distance and acquiring a second digital image of the object at a second object-detector distance different from the first object-detector distance.

15. The system of claim 14, wherein acquiring the first digital image and the second digital image comprises translating the object from a first location at the first object-detector distance to a second location at the second object-detector distance.

16. The system of claim 14, wherein acquiring the first digital image and the second digital image comprises translating the photon beam detector from a first location at the first object-detector distance to a second location at the second object-detector distance.

17. The system of claim 11, wherein the radiation source is an x-ray generator.

18. The system of claim 11, wherein the photon beam detector is a digital image capture device, and wherein the radiation source and the photon beam detector form a digital radiography system.

19. The system of claim 11, wherein the photon beam detector is a cassette-based phosphor storage plate, and wherein the radiation source and the photon beam detector form a computed radiography system.

20. A method for inspecting an aircraft component, the method comprising:
obtaining a plurality of digital images of the aircraft component positioned between a radiation source and a photon beam detector, the digital images taken at different object-detector distances or source-detector distances to create unique grain diffraction patterns in each one of the digital images;
registering the plurality of digital images to a common scale;
removing differences between the plurality of digital images at the common scale to generate an inspection image; and
inspecting the aircraft component using the inspection image.

* * * * *